J. C. MILLER.
MOLDING MACHINE.
APPLICATION FILED MAR. 29, 1915.
1,183,896.  Patented May 23, 1916.
4 SHEETS—SHEET 1.
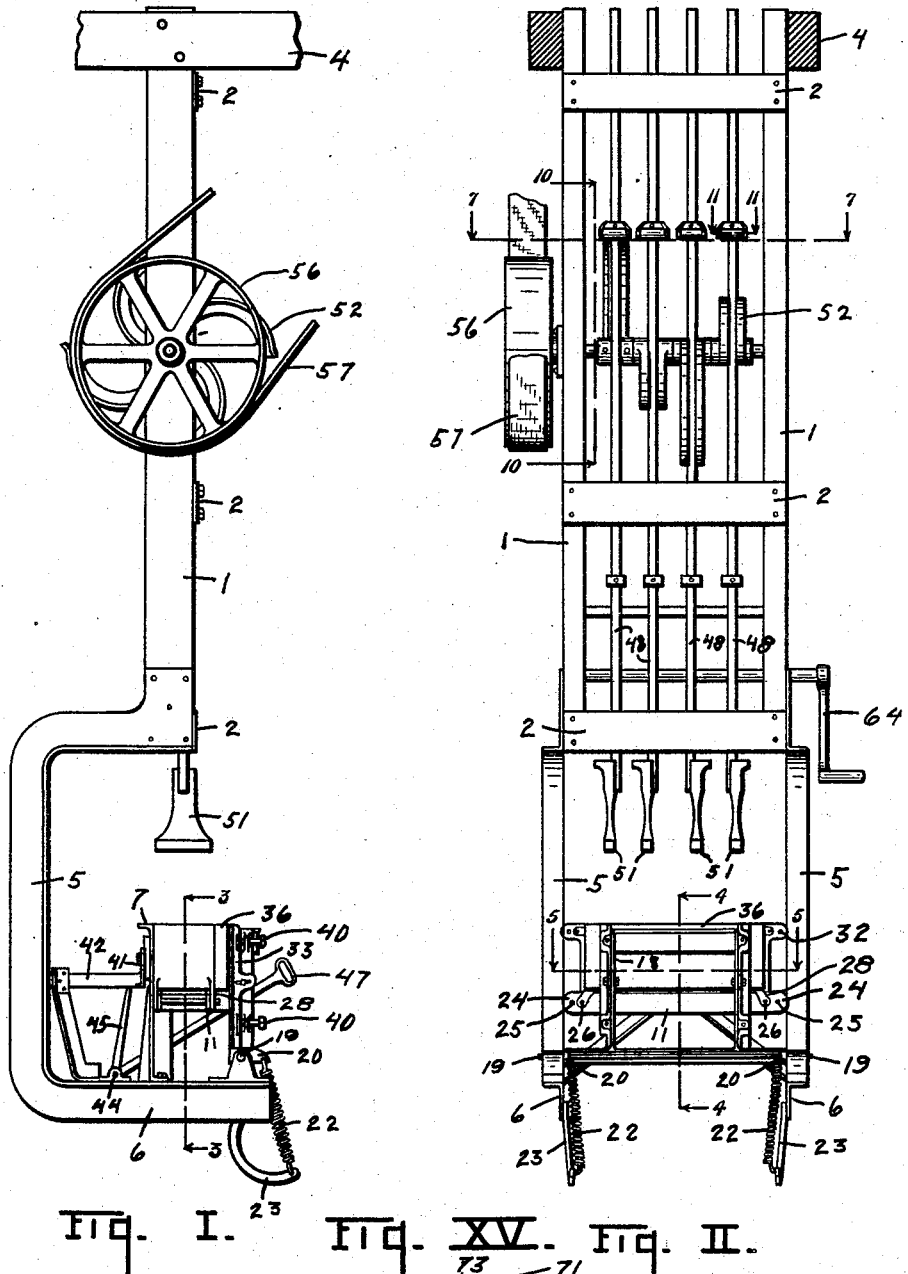
Fig. I.  Fig. XV.  Fig. II.
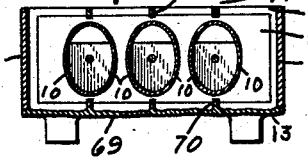
WITNESSES:
B. M. Sanders
L. C. Blake
INVENTOR
John C. Miller
BY
Chappell Earl
ATTORNEYS

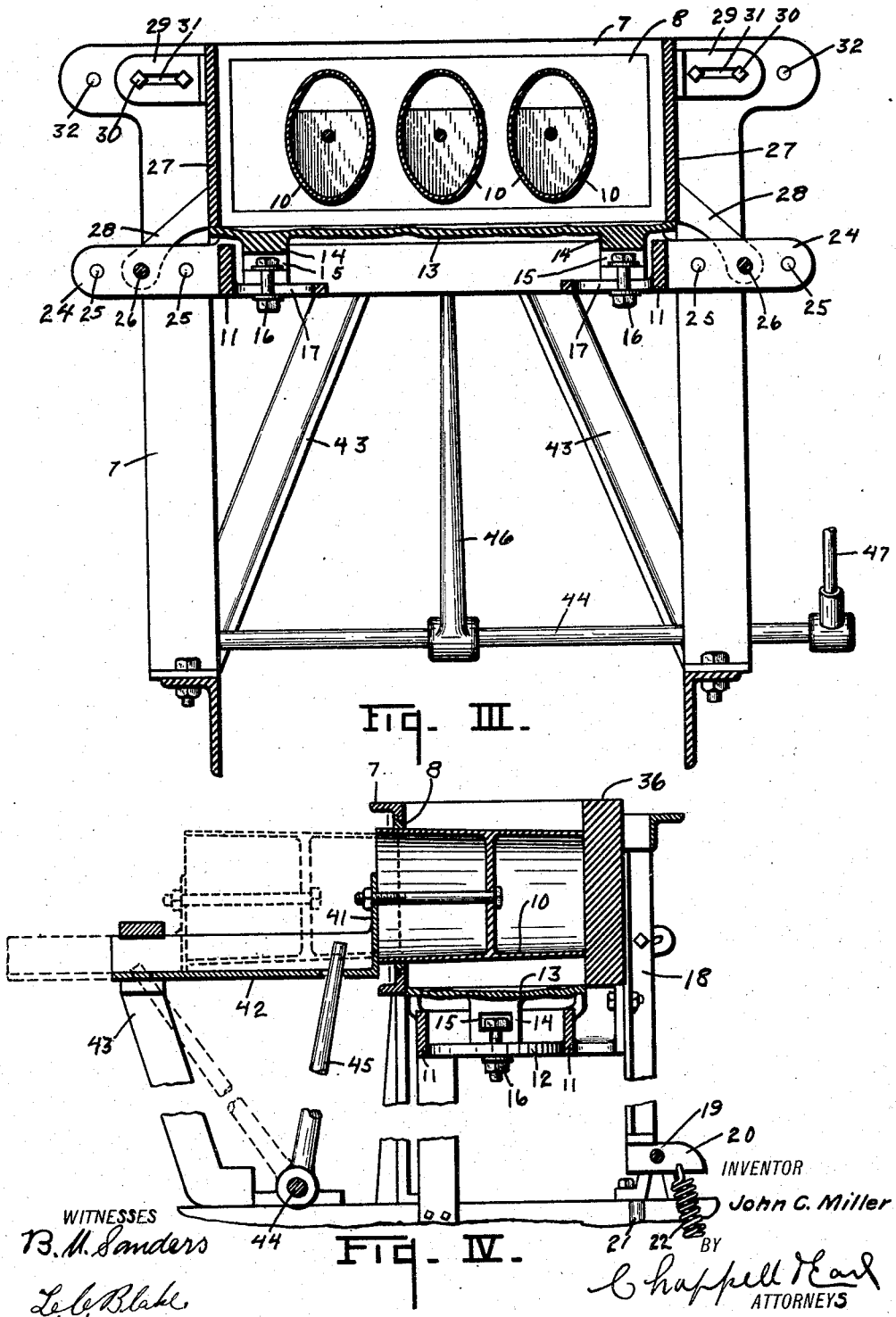

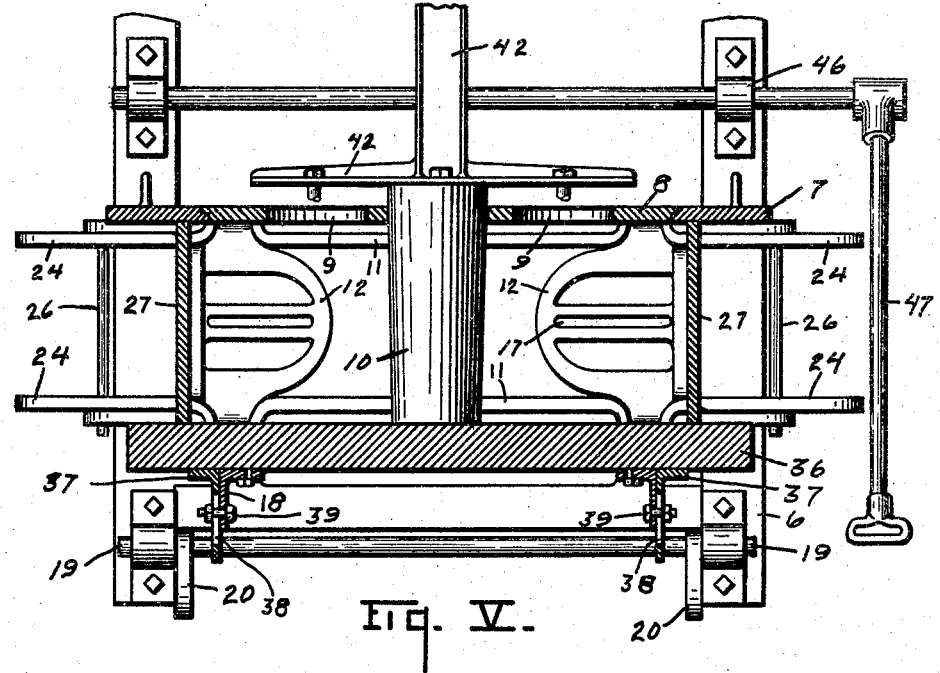
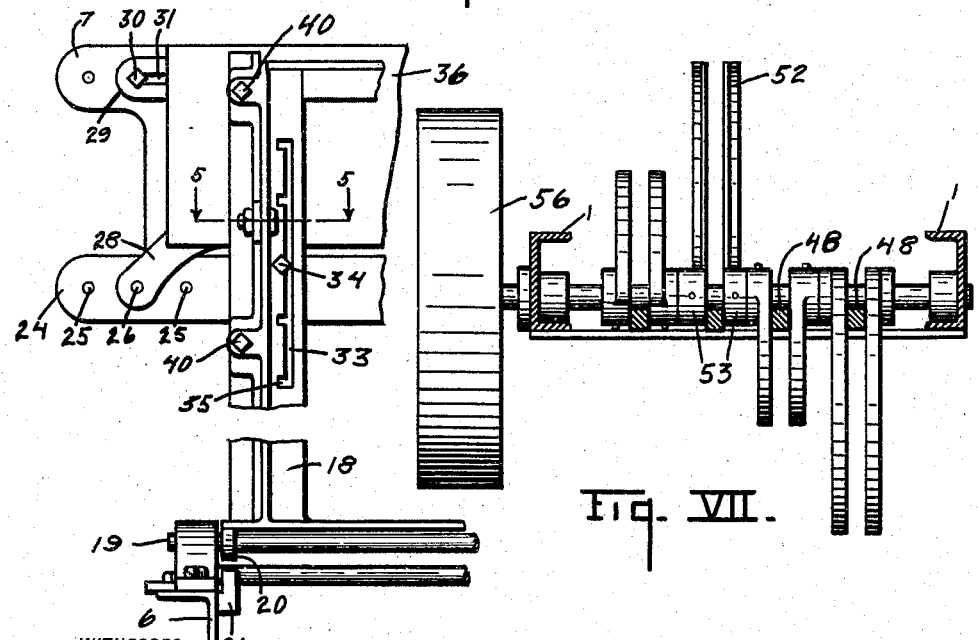

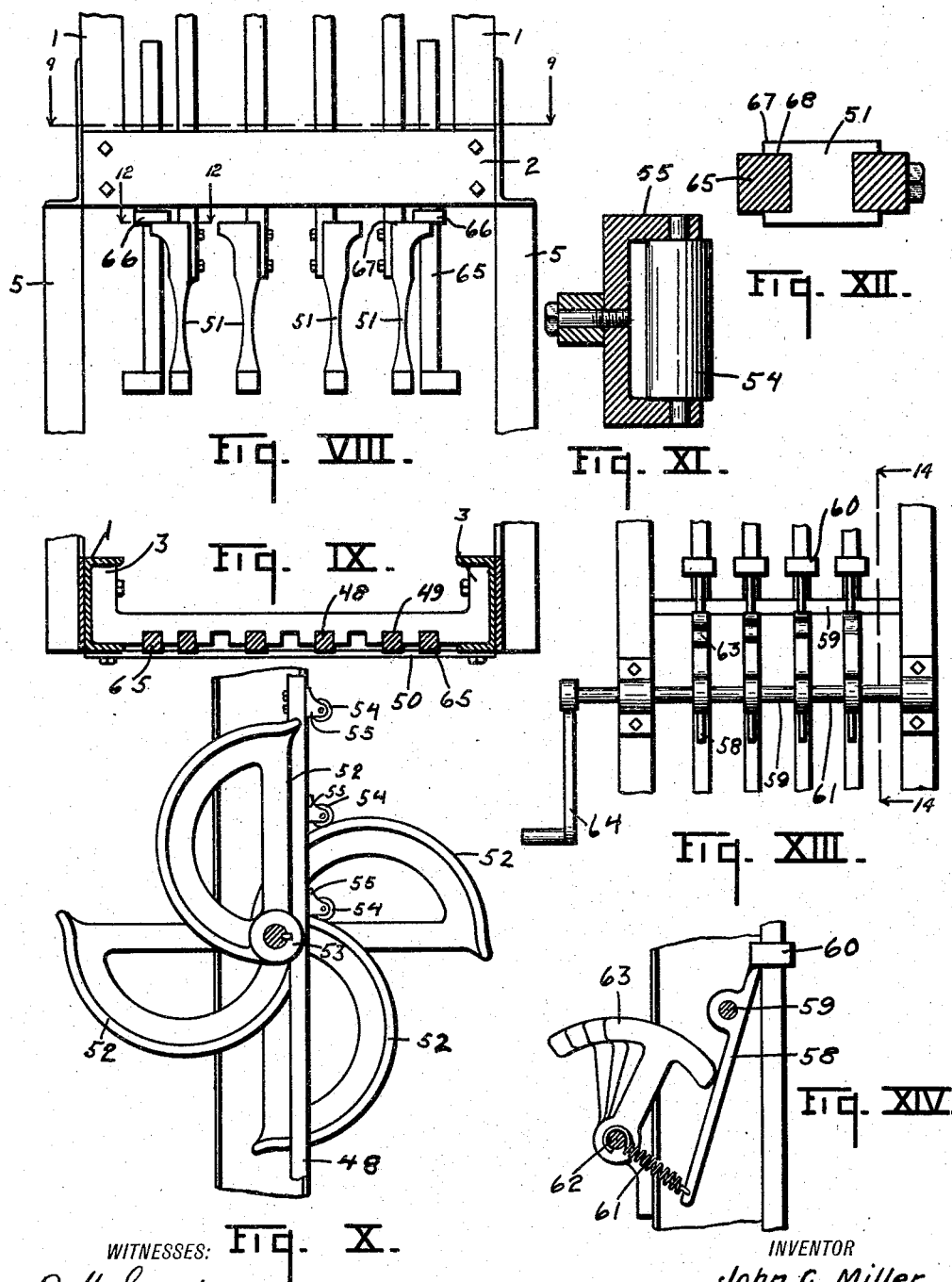

UNITED STATES PATENT OFFICE.

JOHN C. MILLER, OF JACKSON, MICHIGAN.

MOLDING-MACHINE.

1,183,896. Specification of Letters Patent. Patented May 23, 1916.

Application filed March 29, 1915. Serial No. 17,853.

*To all whom it may concern:*

Be it known that I, JOHN C. MILLER, a citizen of the United States, residing at Jackson, county of Jackson, and State of Michigan, have invented certain new and useful Improvements in Molding-Machines, of which the following is a specification.

This invention relates to improvements in molding machines.

The main objects of this invention are: First, to provide in a molding machine an improved tamping mechanism. Second, to provide in a molding machine an improved adjustable mold. Third, to provide in a molding machine an improved mold which may be tilted to facilitate the removal of the molded blocks. Fourth, to provide an improved molding machine which is of large capacity, is comparatively simple in structure and very easy to operate.

Further objects, and objects relating to structural details, will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing forming a part of this specification, in which:

Figure I is a side view of a structure embodying the features of my invention. Fig. II is a front view thereof. Fig. III is a detail vertical section through the mold and its supporting frame on a line corresponding to line 3—3 of Fig. I. Fig. IV is a detail vertical section from front to rear on a line corresponding to line 4—4 of Fig. III. Fig. V is a detail horizontal section on a line corresponding to line 5—5 of Figs. II and VI. Fig. VI is an enlarged detail front view showing details of the saddle and its supports. Fig. VII is an enlarged horizontal section on a line corresponding to line 7—7 of Fig. II, showing details of the tamping bar actuating cams. Fig. VIII is an enlarged detail front view showing the tamping heads with a pair of auxiliary tamps in position. Fig. IX is a detail horizontal section on a line corresponding to line 9—9 of Fig. VIII. Fig. X is an enlarged detail vertical section on a line corresponding to line 10—10 of Fig. II, showing further details of the tamping bar actuating cams. Fig. XI is a detail horizontal section on a line corresponding to line 11—11 of Fig. II, showing the arrangement of the cam engaging rollers on the tamping bars. Fig. XII is a detail horizontal section on a line corresponding to line 12—12 of Fig. VIII, showing details of the auxiliary tamps. Fig. XIII is a detail rear view showing details of the trips for the tamping bar catches. Fig. XIV is a detail vertical section on a line corresponding to line 14—14 of Fig. XIII, showing further details of the catch trips. Fig. XV is a detail vertical section through the mold and cores, showing a modified structure adapted for making blocks which may be readily divided.

In the drawing, similar reference characters refer to similar parts throughout the several views, and the sectional views are taken looking in the direction of the little arrows at the ends of the section lines.

Referring to the drawing, I provide a supporting frame consisting of a pair of channel uprights 1 connected by cross pieces 2 having end portions 3 fitting into and bolted to the uprights, the uprights being arranged with their channels facing inwardly. These uprights constitute hanger members, and are adapted to be secured to a pair of beams or sills 4, see Fig. II. On the lower ends of the uprights is a pair of yoke-like members 5 on the lower arm 6 of which the mold is mounted.

The mold comprises a relatively fixed back member 7 which is rigidly mounted on the arms 6 of the frame members 5, the back member being adapted to receive the core plate 8 which has openings 9 therein through which the cores 10 are projected into and retracted from the mold. These core plates 8 may be changed as desired to accommodate the particular core or cores. This core plate and the back member constitute the rear wall of the mold. The other mold walls are carried by the saddle member 11 which is preferably frame-like, as best shown in Figs. II and V, and is provided with a pair of opposed supports 12 for the face plate 13. This face plate has lugs 14 on its under side provided with T-slots 15 adapted to receive the attaching bolts 16. These attaching bolts are arranged in longitudinal slots 17 in the supports 12. This permits the ready engagement of the attaching bolts 16 with the slots 15 of the lugs 14 in the face plates and permits the ready changing of the face plate.

The saddle member 11 is carried by the supporting bars 18 which are pivoted on the rod 19 to permit their being swung to a horizontal position to facilitate the removal of the blocks or to an upright position, as shown when the mold is erected. The supporting bars 18 are provided with arms 20 which engage stops 21 on the frame to support the parts in horizontal position. The springs 22 are connected to the arms 20 and arms 23 on the frame to assist in the initial swinging of the saddle with the blocks thereon from its erected position. The saddle is provided with pairs of arms 24 at its ends having a series of holes 25 therein for the pivot rods 26 of the end mold walls 27. These end walls are provided with hinge arms 28 mounted on the pivot rods 26. By this arrangement the end walls may be adjusted on the arms of the saddle to provide for different sizes of blocks. The end walls are supported in their erected position by the keepers 29 which are adjustably supported on the back member 7 by means of the bolts 30 engaging the slots 31 in the keepers. The back member is provided with a series of holes 32 for these bolts 30. The saddle is adjustably mounted upon the supporting bars 18, the supporting bars being slotted at 33 to permit the adjustment of the bolts 34, there being notches 35 at one edge of the slot adapted to receive and support the bolts.

The pallet 36 is arranged on edge and adapted to be removed with the block. The lower edge of the pallet rests upon the saddle, see Fig. IV.

To regulate the width of the mold I provide bars 37 having slotted arms 38 thereon engaged by the bolts 39. In the structure illustrated the bars 37 are adjusted to the same plane as the supporting bars 18. It is evident, however, that they can be adjusted inwardly by loosening the bolts 39. Adjusting screws 40 are provided for these bars. By this arrangement of parts the mold can be adjusted for the manufacture of different sized blocks and the face plate can be changed as desired.

The cores 10 are mounted on a cross head 41 carried by the slide 42 which is supported by the upwardly projecting arm 43 on the rear of the mold frame. The cores are actuated from the rock shaft 44 having an arm 45 thereon engaging the slide 42. The rock shaft is mounted in bearings 46 and provided with a lever 47.

To tamp the material in the mold I provide a series of tamping bars 48 which are supported in notch-like bearings 49 in the cross pieces 2 and retained in the bearings by the plates 50 disposed across the same. These tamping bars are provided with tamping heads 51 properly positioned to tamp the material in the mold. The tamping bars are raised by cams 52 arranged in pairs. These cams have hubs 53 which constitute supports for the tamping bars, see Fig. VII. The pairs of cams are spirally spaced relative to each other so that the tamping bars are successively raised. The tamping bars are provided with rollers 54 with which the cams coact, the rollers being carried by the brackets 55 secured to the tamping bars above the cams. By arranging the cams in pairs the tamping bars are raised without any lateral thrust.

The actuating shaft is provided with a pulley 56 driven through the belt 57. The tamping bars are held in their elevated or inoperative position by means of catches 58 pivoted on the cross rod 59 to coact with the stop collars 60 on the tamping bars. The catches are actuated to their engaging positions by the coiled springs 61 connected at one end to the lower ends of the catches and at their other ends to the tripping shaft 22. On the tripping shaft is a series of segment shaped trips 63 arranged spirally on the shaft relative to each other so that they successively engage and release the tamping bars, the shaft being provided with a crank 64. The trips are of such a length that all of the tamps may be held in their inoperative position allowing the tamps to be successively raised and lowered.

I also provide supplemental tamps 65 arranger in suitable bearings in the lower cross bar 2 and provided with collars 66 with which the tamping heads 51 engage to raise the auxiliary tamps, see Fig. XII. By this arrangement an auxiliary tamp may be arranged between each tamping bar and at the outer side of the outer tamping bar, as shown in Fig. VIII. Any desired number of cores may be used or the blocks may be made solid, if desired, in which case a solid plate is substituted for the core plate 18.

In Fig. XVII I show a face plate 69 provided with ribs 70 adapted to form grooves on one side of the block and a bar 71 having ribs 73 adapted to form grooves in the opposite side of the block so that the block can be readily divided into quarters or halves, as desired.

My improved molding machine is very convenient to operate and is of large capacity. I have illustrated and described the same in the form in which I have embodied it in practice. I have not attempted to illustrate or describe various modifications which I contemplate as I believe the disclosure made will enable those skilled in the art to which my invention relates to embody or adapt the same as conditions may render desirable.

Having thus described my invention, what I claim as new and desire to secure by Letters Patent, is:

1. In a molding machine, the combination of a pair of uprights, a plurality of tamping bars, tamping heads mounted on said tamping bars, cross members on said uprights notched to provide bearings for said tamping bars, retaining plates arranged across said tamping bars above said cross members, an actuating shaft mounted on said uprights, pairs of cams on said shaft spaced to revolve at the sides of the tamping bars, said pairs of cams being disposed on said shaft spirally relative to each other, rollers on said tamping bars coacting with said pairs of cams whereby the tamping bars are successively raised, catches for said tamping bars, a cross rod on which said catches are pivotally mounted, stops on said tamping bars with which said catches coact to hold the tamping bars in their elevated positions, a tripping shaft, segmental trips on said tripping shaft coacting with said catches, said trips being spirally disposed on said tripping shaft to successively release said catches and being of such length as to hold all of said catches in disengaging position, and coiled springs connected at one end to said tripping shaft and at the other to said catches.

2. In a molding machine, the combination of a pair of uprights, a plurality of tamping bars, tamping heads mounted on said tamping bars, cross members on said uprights notched to provide bearings for said tamping bars, retaining plates arranged across said tamping bars above said cross members, an actuating shaft mounted on said uprights, pair of cams on said shaft spaced to revolve at the sides of the tamping bars, said pairs of cams being disposed on said shaft spirally relative to each other, rollers on said tamping bars coacting with said pairs of cams whereby the tamping bars are successively raised, catches for said tamping bars, stops on said tamping bars with which said catches coact to hold the tamping bars in their elevated positions, a tripping shaft, segmental trips on said tripping shaft coacting with said catches, said trips being spirally disposed on said tripping shaft to successively release said catches and being of such length as to hold all of said catches in disengaging position.

3. In a molding machine, the combination of a pair of uprights, a plurality of tamping bars, tamping heads mounted on said tamping bars, cross members on said uprights provided with bearings for said tamping bars, auxiliary tamps, the lower cross member being provided with bearings for said auxiliary tamps, said tamping heads having laterally projecting shoulders notched to receive said auxiliary tamps, collars on said auxiliary tamps adapted to engage said shoulders whereby the said auxiliary tamps are raised with the adjacent tamping bar, an actuating shaft mounted on said uprights, cams on said shaft, said cams being disposed on said shaft spirally relative to each other, rollers on said tamping bars coacting with said cams whereby the tamping bars are successively raised, catches for said tamping bars, a cross rod on which said catches are pivotally mounted, stops on said tamping bars with which said catches coact to hold the tamping bars in their elevated positions, a tripping shaft, and segmental trips on said tripping shaft coacting with said catches, said trips being spirally disposed on said tripping shaft to successively release said catches and being of such length as to hold all of said catches in disengaging position.

4. In a molding machine, the combination of a pair of uprights, a plurality of tamping bars, tamping heads mounted on said tamping bars, cross members on said uprights provided with bearings for said tamping bars, auxiliary tamps, the lower cross member being provided with bearings for said auxiliary tamps, said tamping heads having laterally projecting shoulders notched to receive said auxiliary tamps, collars on said auxiliary tamps adapted to engage said shoulders whereby the said auxiliary tamps are raised with the adjacent tamping bar, an actuating shaft mounted on said uprights, cams on said shaft, said cams being disposed on said shaft spirally relative to each other, rollers on said tamping bars coacting with said cams whereby the tamping bars are successively raised, catches for said tamping bars, and trips for said catches.

5. In a molding machine, the combination of a pair of uprights, a plurality of tamping bars, tamping heads mounted on said tamping bars, cross members on said uprights provided with bearings for said tamping bars, an actuating shaft mounted on said uprights, cams on said shaft, said cams being disposed on said shaft spirally relative to each other, rollers on said tamping bars coacting with said cams whereby the tamping bars are successively raised, catches for said tamping bars, a cross rod on which said catches are pivotally mounted, stops on said tamping bars with which said catches coact to hold the tamping bars in their elevated positions, a tripping shaft, and segmental trips on said tripping shaft coacting with said catches, said trips being spirally disposed on said tripping shaft to successively release said catches and being of such length as to hold all of said catches in disengaging position.

6. In a molding machine, the combination of a pair of uprights, a plurality of tamping bars, tamping heads mounted on said tamping bars, cross members on said uprights provided with bearings for said tamping bars, auxiliary tamps, the lower cross member being provided with bearings for said auxiliary tamps, said tamping heads having laterally projecting shoulders notched to receive said auxiliary tamps, collars on said auxiliary tamps adapted to engage said shoulders whereby the said auxiliary tamps are raised with the adjacent tamping bar, an actuating shaft mounted on said uprights, pairs of cams on said shaft spaced to revolve at the sides of the tamping bars, said pairs of cams being disposed on said shaft spirally relative to each other, rollers on said tamping bars coacting with said pairs of cams whereby the tamping bars are successively raised, and means for successively releasing said catches and holding all or a part of them in inoperative position.

7. In a molding machine, the combination of a pair of uprights, a plurality of tamping bars, tamping heads mounted on said tamping bars, cross members on said uprights provided with bearings for said tamping bars, an actuating shaft mounted on said uprights, pairs of cams on said shaft spaced to revolve at the sides of the tamping bars, said pairs of cams being disposed on said shaft spirally relative to each other, rollers on said tamping bars coacting with said pairs of cams whereby the tamping bars are successively raised, catches for said tamping bars, and means for successively releasing said catches and holding all or a part of them in inoperative position.

8. In a molding machine, the combination of a pair of uprights, a plurality of tamping bars, an actuating shaft mounted on said uprights, pairs of cams on said shaft spaced to revolve at the sides of said tamping bars, said cams being provided with hubs constituting supports for said tamping bars, said shaft being disposed so that it constitutes a support for one side of said tamping bars, and rollers on said tamping bars coacting with said pairs of cams.

In witness whereof, I have hereunto set my hand and seal in the presence of two witnesses.

JOHN C. MILLER. [L. S.]

Witnesses:
A. D. LATHROP,
W. W. CLARKE.

Copies of this patent may be obtained for five cents each, by addressing the "Commissioner of Patents, Washington, D. C."